United States Patent Office 2,778,654
Patented Jan. 22, 1957

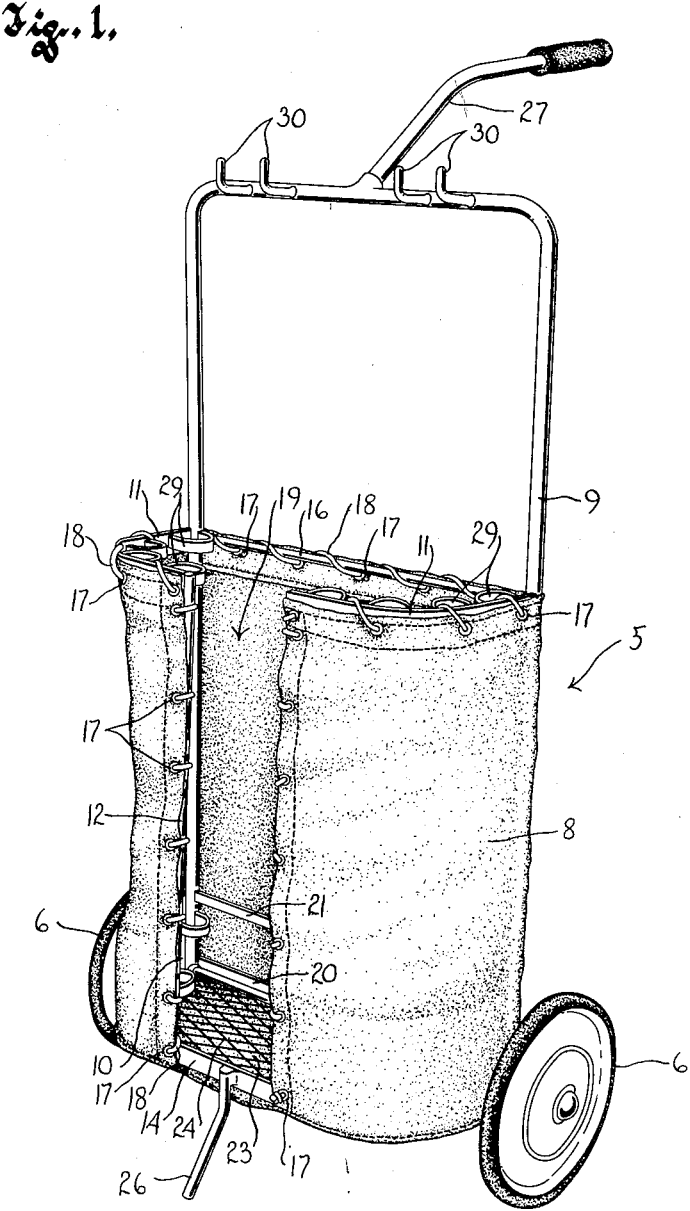

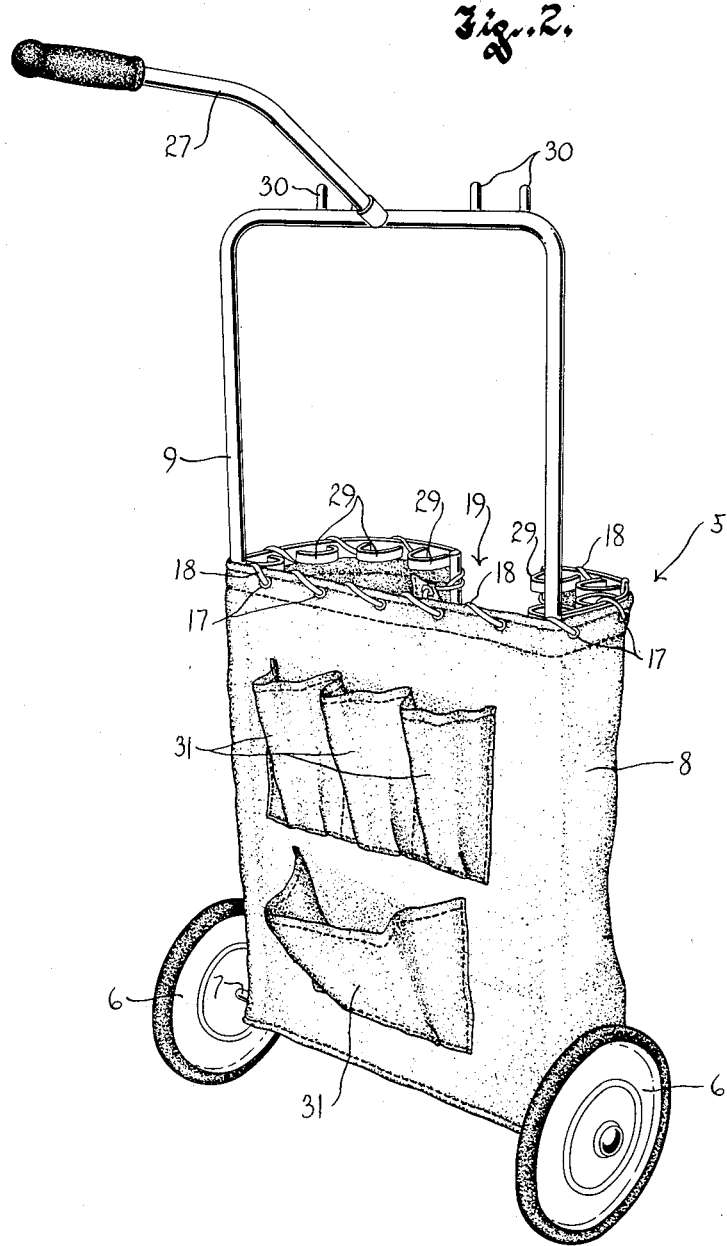

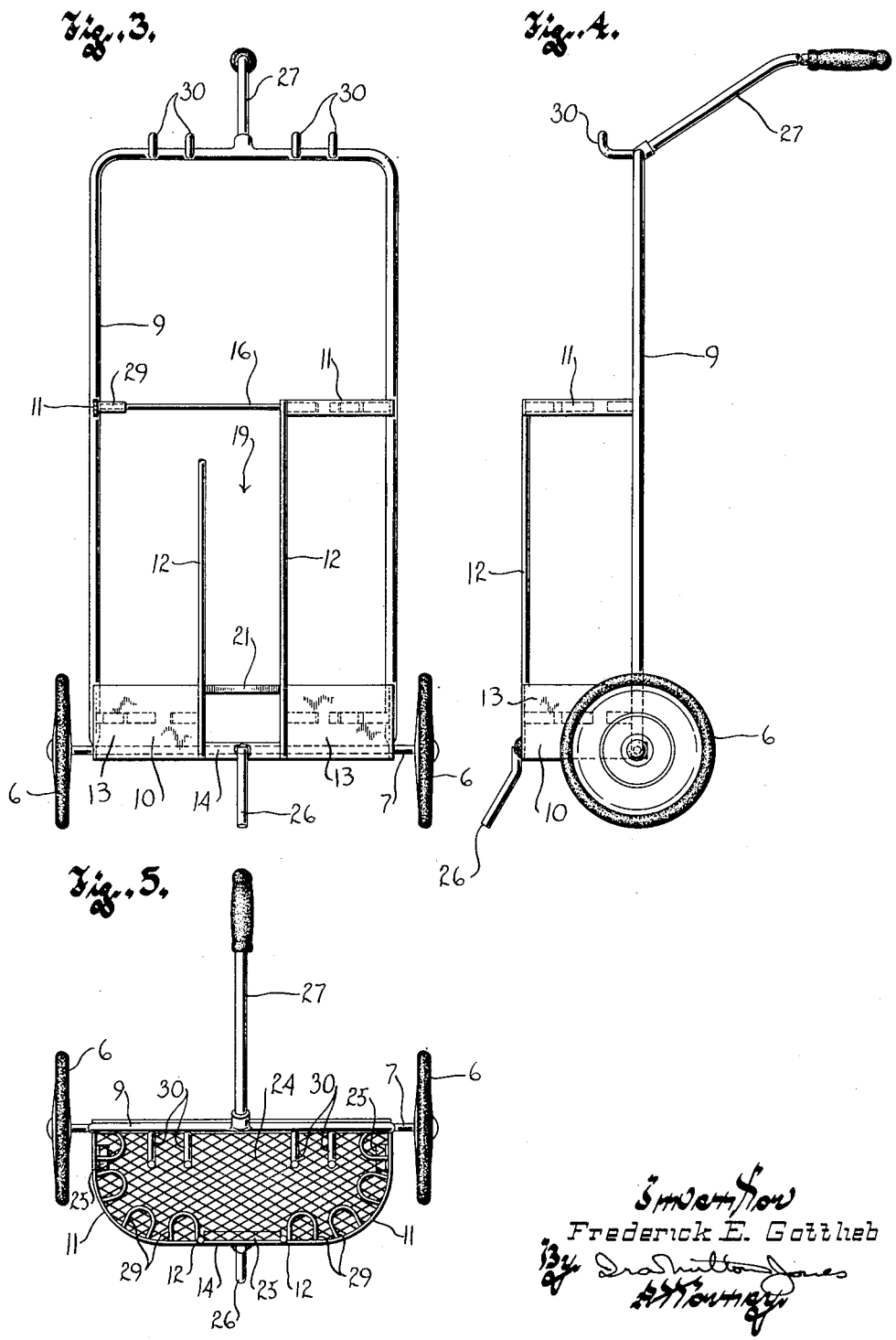

2,778,654

GARDEN TOOL CART

Frederick E. Gottlieb, Menomonee Falls, Wis.

Application May 24, 1954, Serial No. 431,887

3 Claims. (Cl. 280—47.24)

This invention relates to a carrier for gardening implements and the like and has as its principal object the provision of a rugged but lightweight and inexpensive cart in which a number of garden tools may be conveniently transported from place to place.

It is another object of this invention to provide a wheeled carrier in which all of the implements normally used by a gardener can be transported and in which long-handled tools, such as rakes, hoes and brooms, can be stored and transported in an upright position with each tool in an individual holder so as to be readily accessible without interference from other tools.

Another object of this invention resides in the provision of a wheeled cart or carrier of the character described having an upright body into which a heavy implement, such as a shovel, can be placed or from which it can be removed without the necessity for lifting the tool over the walls of the body.

With the above and other objects in view, which will appear as the description proceeds, this invention resides in the novel construction, combination and arrangement of parts substantially, as hereinafter described and more particularaly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is a front perspective view of the garden tool cart of this invention;

Figure 2 is a rear perspective view thereof;

Figure 3 is a front elevational view of the frame of the vehicle, a portion thereof being cut away;

Figure 4 is a side elevational view of the frame; and

Figure 5 is a top view of the frame.

Referring now more particularly to the accompanying drawings in which like numerals designate like parts throughout the several views, the numeral 5 designates generally the body of the garden tool carrier of this invention which is mounted upon a pair of wheels 6 journaled on an axle 7 extending across the body. The cart of this invention is rugged but nevertheless light in weight because, as best seen in Figures 3, 4 and 5, it comprises a light metal framework to which is secured a canvas cover 8 which defines the upright walls of the body.

The framework of the cart is preferably constructed of relatively light tubing and strip or band stock welded together to provide a rear frame member 9, a bottom frame member 10, top frame members 11 and a pair of spaced apart upright front frame members 12 which are connected with the top and bottom frame members. The canvas covering 8 extends continuously around this framework from one upright front member 12 to the other, thus providing a discontinuity or opening at the front of the cart, between the front members.

More specifically, the axle 7 comprises a length of straight tubing on the ends of which the wheels are journaled, and extending upwardly from the axle is the rear frame member 9 comprising a unitary U-shaped length of tubing having its ends welded to the axle at points spaced axially inwardly of the wheels. The bottom frame member 10 preferably comprises a pair of relatively wide bands 13 of sheet metal, each bent to a substantially L-shape connected by an intermediate narrower strip 14. These bands 13 and their connecting strip 14 together define a shallow U, the bight of which is spaced from the axle and the legs of which extend rearwardly toward, and are joined to, the upright legs of the rear frame member, being preferably welded thereto. The U of the bottom frame member extends forwardly from the axle and thus lies in a plane normal to that of the rear frame member.

The top frame members 11 comprise substantially L-shaped strips, bent to substantially the same shape as the wide bands 13 of the bottom frame member, and each is secured at one end, as by welding, to a leg of the upright rear frame member 9, about halfway between its top and bottom, and extends forwardly therefrom to the adjacent upright front member 12, to which its other end is secured. A straight tube 16 having its ends connected to the legs of the rear frame member, on a level with the upper frame members, defines the top of the rear upright wall of the body.

The canvas cover 8 is provided with grommets 17 through which a suitable cord 18 may be laced around the upright front frame members, the upper frame members and the straight length of tubing 16 which defines the top of the rear wall. It will be observed that there is thus a gap or discontinuity 19 in the front upright wall of the cart body, between the upright front members, through which heavy tools such as shovels may be placed in the cart without the necessity for lifting them over the upright walls. The additional width of the bands 10 of the lower frame member protects the lower portions of the canvas walls against blows from the lower ends of tools and implements placed in the cart.

Preferably a strip or tube 20 is secured to the lower ends of the legs of the upright frame member, directly adjacent to the axle, and another strip 21 extends between the legs parallel to and above the strip 20, and these cooperate to maintain the shape of the canvas cover rear wall and reinforce the same.

The canvas cover is held in snug engagement with the bottom frame member without the necessity for lacing it thereto by reason of the fact that it has a bottom 23 sewed thereinto. To protect this bottom from direct impact of tools against it, a rigid foraminous floor 24, of wire mesh or the like, rests on and is welded to small angle brackets 25 on the bottom frame member, directly above the canvas bottom.

A leg 26 extends downwardly from the intermediate portion 14 of the lower frame member to engage the ground and support the cart in an upright position when it is at rest; and a rearwardly projecting handle 27 extending from the bight of the rear frame member permits the cart to be readily tilted rearwardly to raise the leg from the ground so that the cart may be wheeled about the garden.

A number of loop-like holders 29 are secured to the top and bottom frame members, these holders being disposed in aligned pairs with each holder on the upper frame member directly above one on the bottom frame member. The holders thus cooperate in receiving the handles of such tools as rakes, brooms and the like and holding them upright, thus avoiding the awkward entanglements which develop when such tools are permitted to lean in all directions in a small confinement. Forwardly extending hooks 30 on the bight of the upright frame member are adapted to have shovels and the like hung therefrom. Preferably the rear wall of the canvas covering is provided with a number of pockets 31 in which small hand tools, seed packets and the like may be carried.

From the foregoing description taken together with the accompanying drawings, it will be readily apparent that this invention provides a rugged, inexpensive and lightweight cart or carrier for garden tools wherein long-handled implements will be conveniently held in upright position and which does not require that shovels and the like be lifted over the upright wall of the cart body when they are placed in the cart or removed therefrom.

What I claim as my invention is:

1. A cart for garden tools and the like comprising: a straight elongated axle having a pair of wheels rotatably mounted near the ends thereof; an upright U-shaped rear frame member having its legs extending downwardly and secured at their lower ends to the axle; a straight rod having its ends connected with the legs of the rear frame member intermediate the bight of the rear frame member and the axle and parallel to the latter; a substantially U-shaped bottom frame member secured to the axle with the bight of its U spaced forwardly of the axle and its legs extending rearwardly and secured at their rear ends to the lower ends of the legs of the rear frame member; a pair of substantially L-shaped upper frame members each secured at one end to a leg of the rear frame member adjacent to said rod and extending forwardly therefrom and toward the other upper frame member, the adjacent free ends of said upper frame members being spaced from one another; a pair of upright frame members each extending from the free end of one of said upper frame members downwardly to the bight of the bottom frame member, said upright frame members being parallel to the legs of the rear frame member and one another; a fabric covering extending from one of said upright frame members around the rear frame member to the other upright frame member, and from the bottom frame member to the top frame members, said covering providing upright body walls having an opening therein at the front thereof, between the upright members; means providing a bottom wall in said body; and a downwardly extending leg on the front of said bottom frame member to enable the cart to stand upright when said leg engages the ground and to permit the cart to be freely movable on its wheels when tilted rearwardly.

2. The garden tool cart of claim 1 further characterized by loop-like holders on said upper and lower frame members, on the inside of the upright body walls, in which the handles of garden tools may be received to hold the tools upright.

3. A cart for garden tools and the like comprising: a straight elongated axle having a pair of wheels rotatably mounted near the ends thereof; an upright U-shaped rear frame member having its legs extending downwardly and secured at their lower ends to the axle; a substantially U-shaped bottom frame member secured to the axle with the bight of its U spaced forwardly of the axle and its legs extending rearwardly and secured at their rear ends to the lower ends of the legs of the rear frame member; means providing a bottom wall having marginal edge portions secured to and supported by said U-shaped bottom frame member; a pair of substantially L-shaped upper frame members each secured at one end to a leg of the rear frame member intermediate the bight of the rear frame member and the axle, each of said L-shaped upper frame members extending forwardly from the rear frame member and toward the other upper frame member, the adjacent free ends of said upper frame members being spaced from one another; means providing an upright wall extending from the bottom frame member upwardly to said substantially L-shaped upper frame members, said wall extending between the legs of the U-shaped rear frame member and around the U-shaped bottom frame member toward the front of the cart, but having a pair of upright spaced apart edges defining an opening at the front of the cart; and substantially rigid upright brace means reinforcing said upright edges of said wall and affording support to the front free end portions of said L-shaped frame members.

References Cited in the file of this patent

UNITED STATES PATENTS

| D. 148,684 | Fletcher | Feb. 17, 1948 |
| 1,570,500 | Kennedy | Jan. 19, 1926 |
| 1,713,095 | Scheffler | May 14, 1929 |
| 2,262,298 | Proctor | Nov. 11, 1941 |
| 2,368,752 | Duis | Feb. 6, 1945 |
| 2,634,933 | Grimsley | Apr. 14, 1953 |

FOREIGN PATENTS

| 686,366 | Great Britain | Jan. 21, 1953 |